(12) United States Patent
Hurlburt et al.

(10) Patent No.: US 8,424,977 B2
(45) Date of Patent: Apr. 23, 2013

(54) FRONT TOWING GLAD HANDS

(75) Inventors: Keith Alan Hurlburt, Macungie, PA (US); David Robert Jeffery, Schnecksville, PA (US)

(73) Assignee: Mack Trucks, Inc., Greensboro, NC (US)

(*) Notice: Subject to any disclaimer, the term of this patent is extended or adjusted under 35 U.S.C. 154(b) by 1352 days.

(21) Appl. No.: 12/157,213

(22) Filed: Jun. 9, 2008

(65) Prior Publication Data

US 2009/0302674 A1 Dec. 10, 2009

(51) Int. Cl.
*B60T 13/00* (2006.01)
*B60T 7/20* (2006.01)

(52) U.S. Cl.
USPC .............................................. 303/7; 188/3 H

(58) Field of Classification Search ........... 303/7, 118.1, 303/3 R, 3 H; 188/3 R, 3 H
See application file for complete search history.

(56) References Cited

U.S. PATENT DOCUMENTS

| | | | | |
|---|---|---|---|---|
| 3,953,079 A | * | 4/1976 | Sebo et al. | 303/7 |
| 4,258,959 A | * | 3/1981 | Knight et al. | 303/7 |
| 4,804,237 A | * | 2/1989 | Gee et al. | 303/7 |
| 5,458,402 A | * | 10/1995 | Jeffery | 303/13 |
| 5,466,053 A | * | 11/1995 | Koelzer | 303/7 |
| 2006/0076824 A1 | * | 4/2006 | Soupal | 303/118.1 |
| 2006/0244308 A1 | * | 11/2006 | Bobby et al. | 303/118.1 |
| 2007/0235275 A1 | * | 10/2007 | Judy | 188/355 |
| 2008/0202871 A1 | * | 8/2008 | Battistella | 188/170 |
| 2008/0258542 A1 | * | 10/2008 | Soupal | 303/7 |

* cited by examiner

*Primary Examiner* — Bradley King
*Assistant Examiner* — Vishal Sahni
(74) *Attorney, Agent, or Firm* — Potomac Patent Group PLLC

(57) ABSTRACT

A towing arrangement on a vehicle includes a pair of glad hands for receiving pressurized air and a plurality of double check valves connecting the glad hands to valves associated with a braking system of the vehicle. Air from a first glad hand is supplied through a first of the double check valves to a spring brake modulating relay valve associated with spring brakes of the vehicle. Air from a second glad hand is supplied through a second of the double check valves to a first release valve associated with service brakes of a front axle of the vehicle and through a third of the double check valves to a second release valve associated with service brakes of a rear axle of the vehicle.

20 Claims, 5 Drawing Sheets

FRONT TOWING GLAD HANDS

BACKGROUND

This invention relates to controlling the braking systems of a towed vehicle by a towing vehicle.

Towing of vehicles such as trucks is known. Typically, a vehicle having mechanical or other problems that prevents its operation is towed by a towing vehicle to a place for repair, etc. A malfunctioning vehicle such as a truck can be towed by having one axle hoisted by a towing truck and the towed vehicle is moved on its other axle.

Trucks are also towed by pulling them with all axles on the ground (road). Trucks are increasingly being equipped with a glad hand structure (such as front glad hands to couple the brake system with the towing vehicle) to facilitate towing of the truck in this manner. In addition to the physical connections made between the towing vehicle and towed vehicle for facilitating towing, the glad hand structure is utilized for controlling the brakes on the towed vehicle from the towing vehicle.

A truck has two types of brakes—service brakes and parking brakes. The service brakes can be separated into primary brakes and secondary brakes. The primary brakes are associated with the drive axle (i.e. the rear wheels). The secondary brakes are associated with the steer axle (i.e. the front wheels). Parking brakes may also be referred to as emergency brakes or as spring brakes. Parking brakes are also associated with the drive axle (i.e. the rear wheels).

In order to permit vehicle motion, pressurized air is used to compress the emergency brake springs (i.e. to release the emergency brake). In order to stop the vehicle using the emergency brake (i.e. to apply the emergency brake), the springs are released by releasing the pressurized air from the spring brake chambers. The air system is used to engage or disengage the brakes on a truck. Pressurized air (or, high pressure air) in the brake system is supplied by a compressor powered by the engine.

A general braking system 100 associated with trucks is illustrated in FIG. 1A. Braking system 100 includes a wet (or supply) tank 105 which receives air that has been pressurized by a compressor. Air from the wet tank 105 is supplied to the primary air tank 110 and the secondary air tank 115. In general, air from the primary tank 110 is used to operate and control the rear brakes (i.e. the drive axle) 150 while air from the secondary tank 115 is used to operate and control the front brakes (i.e. the steer axle) 170. For illustrative purposes, only one rear axle 150 is shown; a truck may have more than one rear axle. The rear axle 150 includes both (rear or primary) service brake chambers 15 and spring brake chambers 25. Air is supplied to each of these chambers via separate lines as illustrated.

The primary tank 110 and the secondary tank 115 supply air to a treadle valve that is actuated by the brake pedal. The treadle valve may include or consist of two pneumatically separate valves such as a top or primary portion TVR 140 and a bottom or secondary portion TVF 160. The portion of the valve closest to the brake pedal, TVR 140, receives air from the primary tank 110 and controls the rear axle brakes 150. The remaining portion of the valve, TVF 160, receives air from the secondary tank 115 and controls the brakes on the front axle 170.

When the brake pedal is depressed, TVR 140 is triggered and a signal is communicated to rear axle relay valve, RV 145, which applies air to the rear brakes 150 to slow or stop the vehicle. The air is supplied from the primary tank 110. Simultaneously, the secondary portion of the treadle valve, TVF 160, is triggered and air is delivered via the quick release valve, QRV 165, to activate the front brakes 170.

Air from the primary tank 110 is supplied via a T fitting 120 (a T fitting is herein after referred to as a T) to TVR 140 and to double check valve DCV 125. Air from the secondary tank 115 is supplied to TVF 160 and double check valve DCV 125. Air from DCV 125 is supplied via T 130 to parking control valve PCV 135 and to spring break relay valve SBRV 190. Air from PCV 135 is also supplied to spring brake control valve SBCV 180. As is known, a double check valve permits air from one of multiple sources to flow based on which source provides the higher pressure—the higher pressure air is permitted to flow.

The parking or emergency brake is controlled by PCV 135. In order to facilitate vehicle motion, the parking brake is released by applying pressurized air from PCV 135 (via SBCV 180 and SBRV 190) to spring brake chambers on rear brakes 150. This pressure releases the rear brakes. The vehicle can be stopped using the parking brake by shutting off pressurized air from PCV 135 to the spring brake chambers. This results in the parking brakes being applied.

Brakes on trucks typically fail due to loss of pressure in the primary circuit (associated with the primary tank). In such a situation, the parking or spring brakes have traditionally been controlled by the park control relay valve (such as PCV 135). More recently, federal regulations specified the use of a spring brake inversion valve to facilitate the control of parking or spring brakes via the treadle rather than having to use the instrument panel-mounted park control valve.

A braking system utilizing a spring inversion valve (which may also be referred to as an inversion valve or a spring brake modulating relay valve) is illustrated in FIG. 1B. If a pressure loss occurs in the primary tank, the spring brake modulating relay valve, SBMRV 185, allows the spring brakes to be applied by the treadle valve 140, 160 rather than having to use the park brake control valve, PCV 135.

When the air brake system is functioning properly, SBMRV 185 monitors delivery pressure from the treadle valve TVR 140 and TVF 160 (via Ts 240 and 260 for example). When the parking control valve, PCV 135, is pushed in to release the spring (or parking) brakes, the modulating relay valve SBMRV 185 opens a path from the secondary tank 115 to the spring brake chambers to keep the spring brakes released to permit vehicle motion.

Air from the primary tank 110 is supplied to the treadle TVR 140 and to PCV 135 via T 230. Air is also supplied to the relay valve for the rear brakes, RV 145, by the primary tank 110 and by TVR 140. Air from the secondary tank 115 is supplied to the treadle TVF 160 and to PCV 135 via T 250. Air from the secondary tank 115 is also supplied to the modulating relay valve SBMRV 185 via a check valve 195. Air from TVF 160 is also supplied to the front brakes 170 via T 240 and quick release valve, QRV 165.

A loss of primary pressure at the spring brake modulating relay valve, SBMRV 185, results in an unbalanced condition inside the valve since secondary control pressure from treadle valve TVF 160 is present without control pressure from the relay valve RV 145. A service brake application (via the treadle) allows pressure from the secondary tank to enter SBMRV 185 in proportion to the amount of force applied to the treadle valve. The modulating relay valve SBMRV 185 then allows a proportionate amount of spring brake hold-off pressure to exhaust from the spring brake chambers.

Towing via glad hands is not compatible for trucks utilizing the spring brake modulating relay valve such as SBMRV 185. Previous front towing glad hand systems utilized only the primary circuit (i.e. the primary tank). In order for the spring brake modulating relay valve to function properly, air from the secondary circuit/tank is also (i.e. in addition to air from the primary tank) required. A need exists, therefore, to provide a braking system for towing a vehicle having glad hands and a spring brake modulating relay valve.

SUMMARY

In one embodiment, a towing arrangement on a vehicle is disclosed. The towing arrangement comprises: at least two glad hands for receiving pressurized air and a plurality of double check valves connecting the glad hands to valves associated with a braking system of the vehicle, wherein air from a first one of the glad hands is supplied through a first one of the double check valves to a spring brake modulating relay valve associated with spring brakes of the vehicle, and air from a second one of the glad hands is supplied through a second one of the double check valves to a first release valve associated with service brakes of a front axle of the vehicle and through a third one of the double check valves to a second release valve associated with service brakes of a rear axle of the vehicle.

In another embodiment, a method for controlling a motion of a truck is disclosed. The method comprises: establishing a connection from a towing truck to a plurality of glad hands of the truck, providing air to a first double check valve via a first one of the glad hands, releasing spring brakes of the truck with the air supplied to the first double check valve, detecting application of service brakes on a towing truck, providing air to a second double check valve and a third double check valve via a second one of the glad hands and engaging service brakes of the truck with the air supplied to the second and third double check valves.

BRIEF DESCRIPTION OF THE DRAWINGS

The several features, objects, and advantages of Applicants' invention will be understood by reading this description in conjunction with the drawings, in which.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Figure 1A:
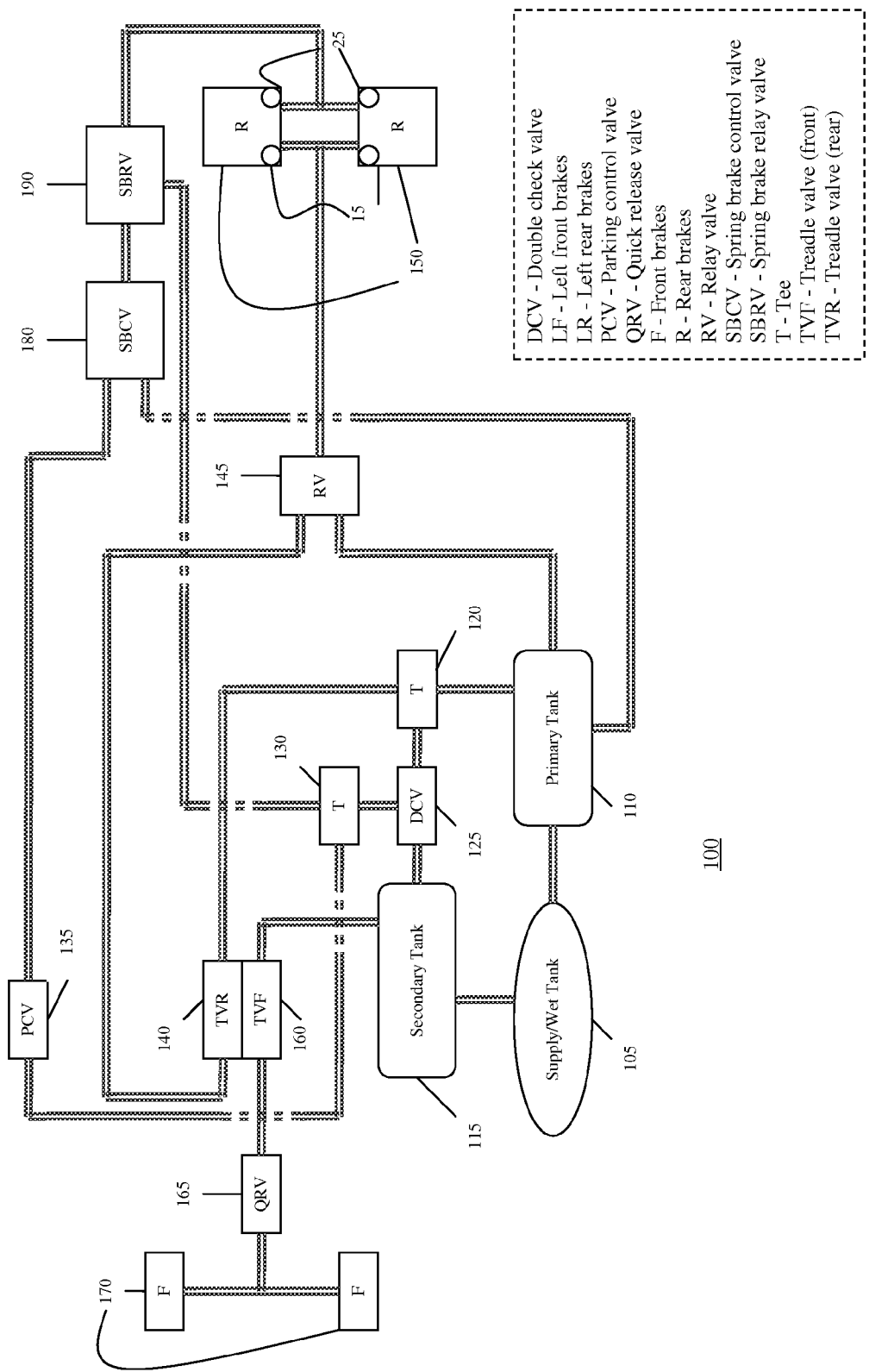
FIG. 1A illustrates a general air brake system for a truck without a spring brake modulating relay valve.
Figure 1B:
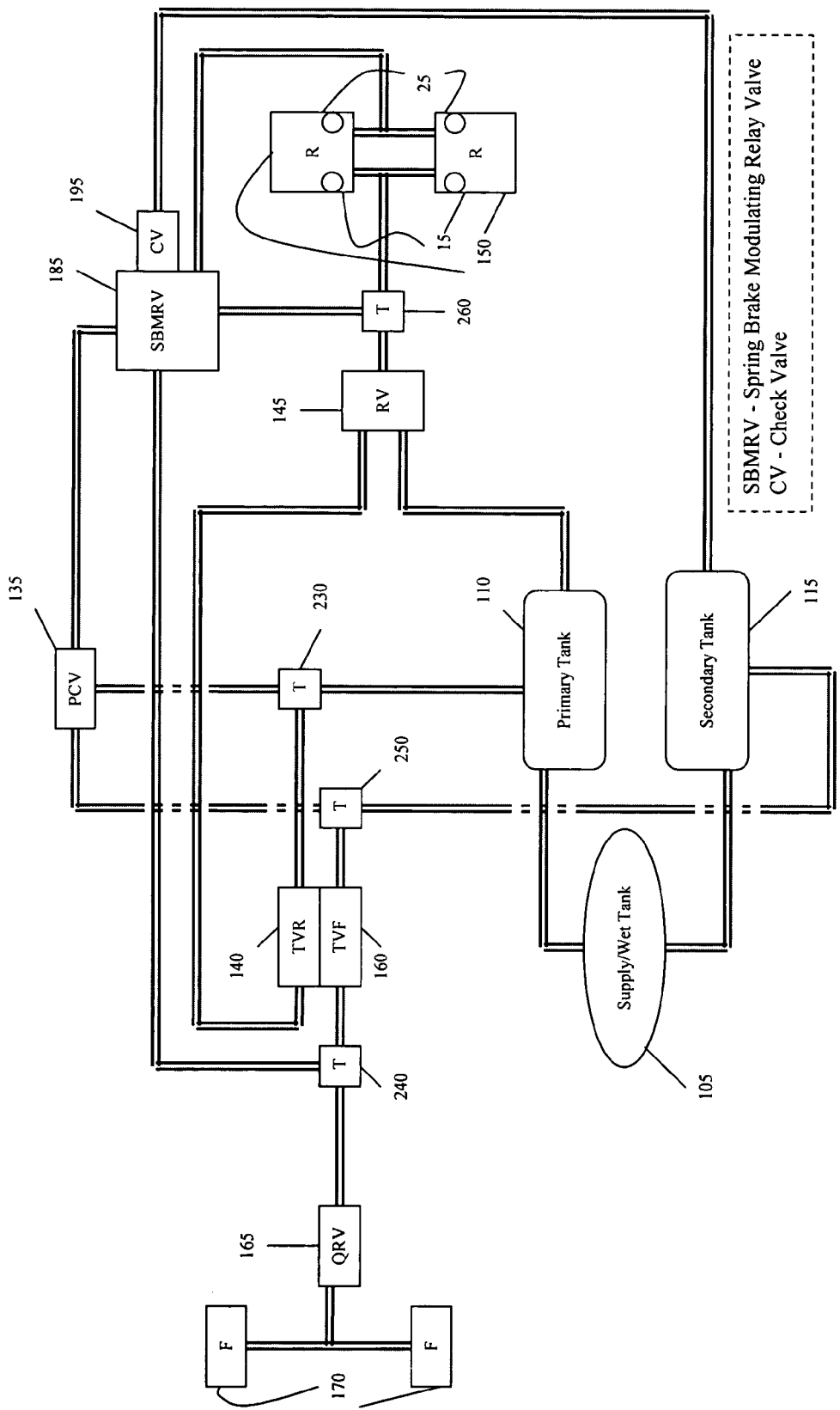
FIG. 1B illustrates an air brake system utilizing a spring brake modulating relay valve.
Figure 2:
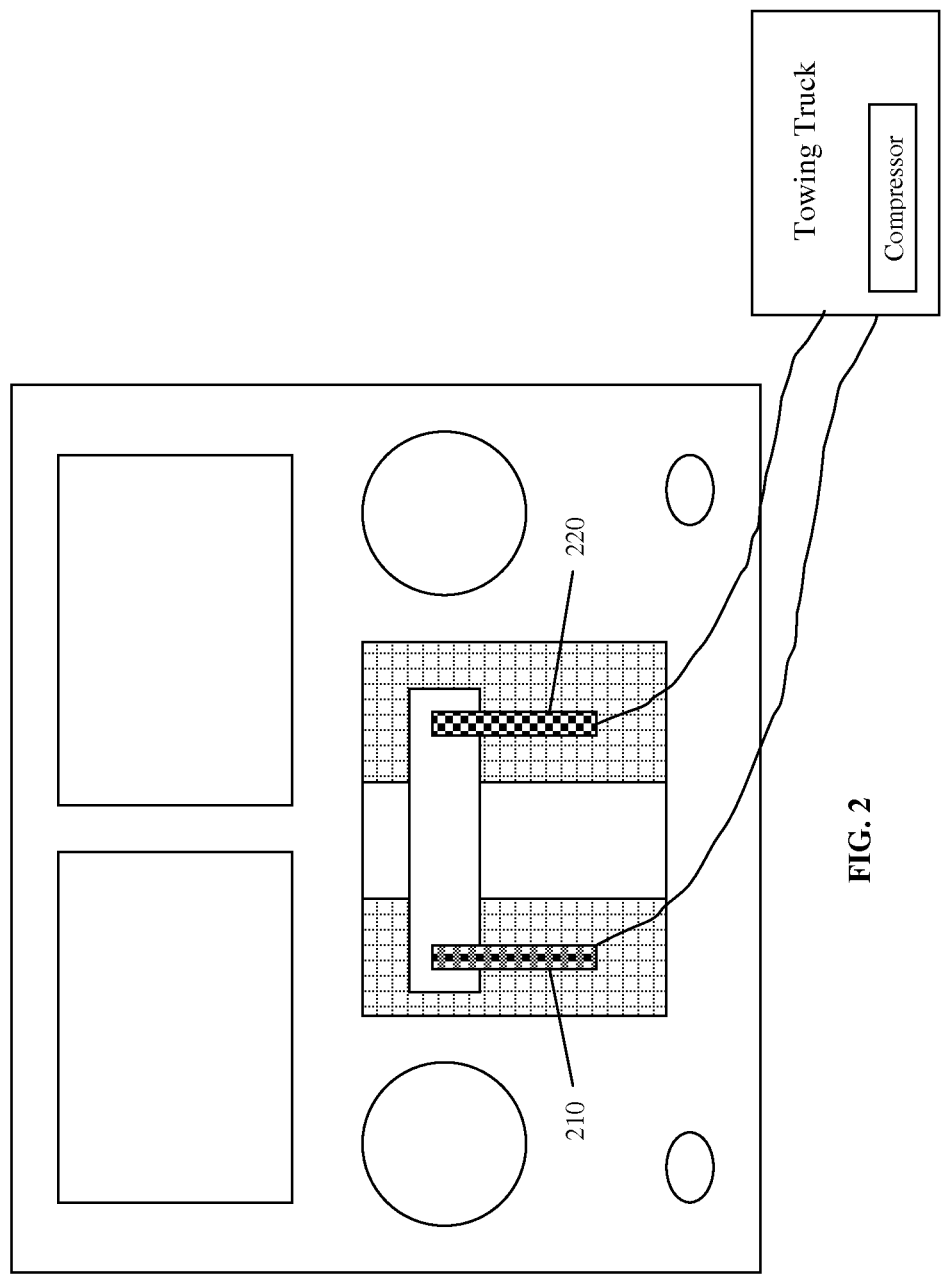
FIG. 2 illustrates a truck with front glad hands.

As illustrated in FIG. 2, a truck 200 can be equipped with glad hands 210 and 220. Brakes on a towed truck may be controlled by the towing truck via controls associated with glad hands 210 and 220.

Figure 3:
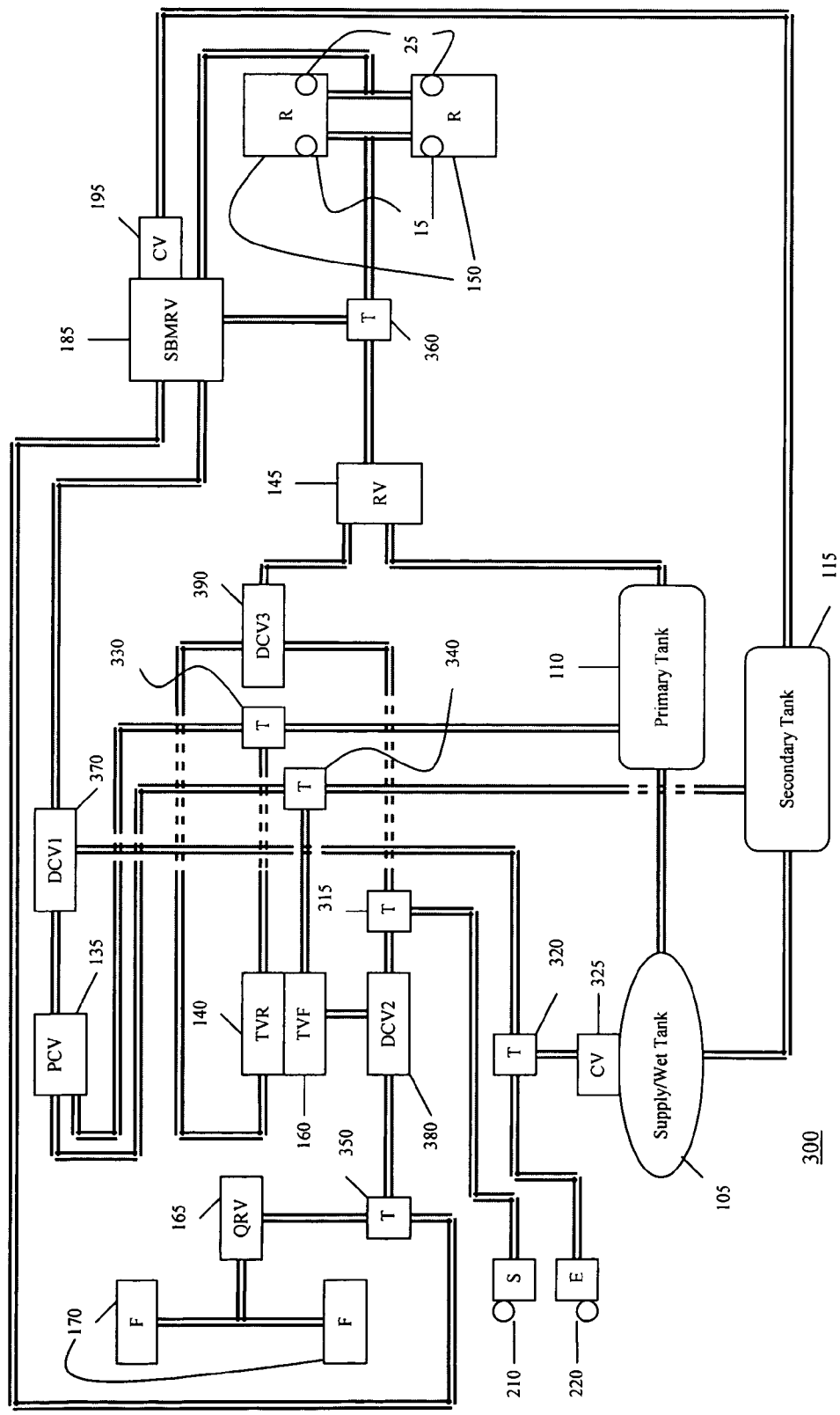
FIG. 3 illustrates an air brake system according to an exemplary embodiments of the invention.

In exemplary embodiments, as illustrated in FIG. 3, emergency brake glad hand 220 connects to wet tank 105 via T 320 and check valve CV 325 to provide air to primary tank 110 and secondary tank 115. Emergency glad hand 220 also connects (via T 320) to spring brake modulating relay valve SBMRV 185 via a double check valve, DCV 1 370.

Service glad hand 210 supplies air to quick release valve QRV 165 (via T 315) through double check valve DCV2 380 (and T 350). Service glad hand 210 also supplies air to relay valve RV 145 (via T 315) through double check valve DCV3 390 via T 315.

Primary tank 110 supplies air to relay valve RV 145 and to both TVR 140 and PCV 135 via T 330. Secondary tank 115 supplies air to SBMRV 185 via check valve CV 195. Secondary tank 115 also supplies air to both TVF 160 and PCV 135 via T 340.

Air from TVF 160 is supplied to DCV2 380. DCV2 permits air from either TVF 160 or T 315 to flow to T 350 depending on the pressure of air from each of these sources (i.e. T 315 or TVF 160)—air from the higher pressure source is permitted. Air from DCV2 380 is supplied to both QRV 165 (for engaging the front brakes 170) and to SBMRV 185.

Air from TVR 140 is supplied to DCV3 390. DCV3 permits air from either TVR 140 or T 315 to flow to RV 145 depending on the pressure of air from each of these sources—air from the higher pressure source is permitted.

Air from PCV 135 is supplied to DCV1 370. DCV1 370 permits air from either PCV 135 or emergency glad hand 220 (via T 320) to flow to SBMRV 185 based on the source having the higher pressure.

The arrangement as illustrated in FIG. 3 provides the air needed to operate both front brakes 170 and rear brakes 150 of a towed truck. Such an arrangement speeds up the braking of the towed vehicle without affecting the breaking of the towing vehicle.

Glad hands S 210 and E 220 may be mounted to the front portion of a truck which can be towed. The connection between T 320 and wet tank 105 is via a one way check valve CV 325 permitting air flow into the wet tank 105 (and does not permit reverse flow from wet tank 105). The air flow from wet tank 105 to each of primary tank 110 and secondary tank 115 is also via a one way check valve permitting air flow toward the primary and secondary tanks.

A method (or process 400) of towing or controlling the motion of a truck in accordance with exemplary embodiments may be described with reference to FIG. 4. A glad hand connection, using glad hands 210 and 220, may be made between the towed truck and a towing truck at 410. The towing truck has two buttons for "charging" up (or supplying pressurized air to release) the spring brakes. One of these buttons is designated for the towing truck and the other button is designated for the truck being towed. The button designated for the towed truck may be actuated at 420. Pressurized air (from the compressor of the towing truck) may be supplied through emergency glad hand 220 to supply tank 105 and to DCV1 370 at 430.

Air from DCV1 370 may be supplied to SBMRV 185 to release the spring brakes at 440. Air from the supply tank 105 may charge the primary and secondary tanks 110 and 115. Air may be supplied by the primary tank 110 to treadle TVR 140, PCV 135 and RV 145. Air may be supplied by the secondary tank 115 to SBMRV 185, treadle TVF 160 and PCV 135.

The spring brakes of the towed truck are now released to permit vehicle motion and towing by the towing truck (the button designated for towing truck is also actuated to release the spring brakes of the towing truck). As the truck is being towed, if the operator of the towing truck applies the (service) brakes (on the towing truck), pressurized air may be supplied to the service glad hand 210.

Figure 4:
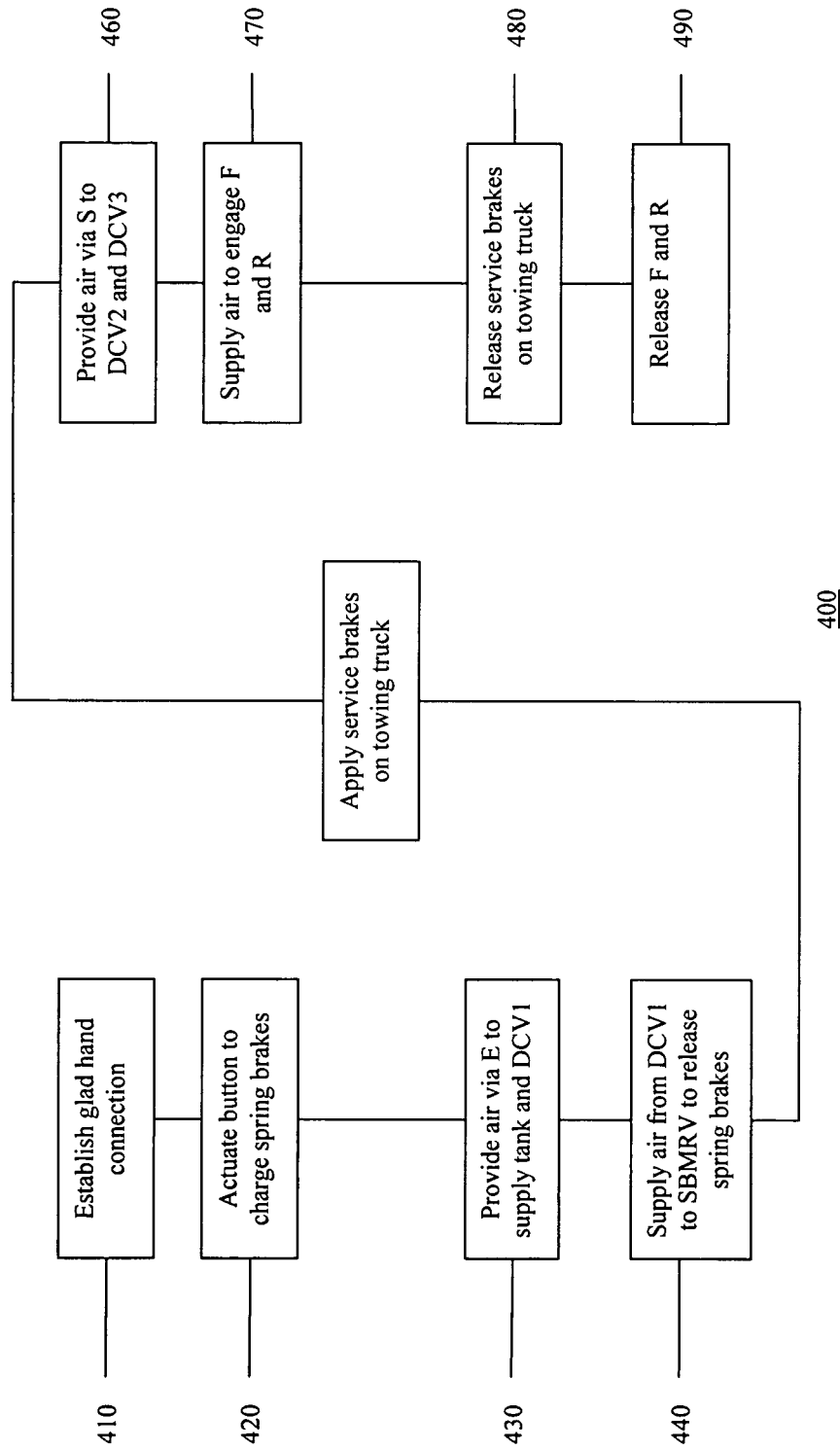
FIG. 4 illustrates a method according to an exemplary embodiment of the invention.

Referring to FIG. 4, the operator may apply (service) brakes on the towing truck at 450 (via the treadle of the towing truck). Air may be supplied through service glad hand 210 to DCV2 380 and DCV3 390 (via T 315) at 460. Air from DCV2

380 may be supplied to engage or apply front service brakes F 170 and air from DCV3 390 may be supplied to engage or apply rear service brakes R 150 at 470.

The operator may release the service brakes on the towing truck at 480. Pressure to the front brakes 170 and rear brakes 150 may be released at 490 to permit vehicle movement.

When the truck is being towed, no operator interaction may be present in the towed truck. As such, there is no operator interaction with the treadle TVR 140 and TVF 160 or with PCV 135. Therefore, no pressure is provided from PCV 135 to DCV1 370, TVF 160 to DCV2 380 or from TVR 140 to DCV3 390. However, once towing is complete and the glad hands are disconnected, no air flows to DCV1, DCV2 and DCV3 from the glad hands and the air system of the truck returns to a normal operation mode by receiving air from PCV 135, TVR 140 and TVF 160 to engage or release each of the spring brakes, the rear service brakes R 150 and front service brakes 170.

The term air or pressure as used herein may refer to pressurized or compressed air that is needed to apply service brakes or to release the spring brakes. Furthermore, in some embodiments, application and release of spring brakes on the towing truck may be detected prior to providing pressurized air to the towed truck.

It will be appreciated that the procedures (arrangement) described above may be carried out repetitively as necessary to control a vehicle. To facilitate understanding, many aspects of the invention are described in terms of sequences of actions. It will be recognized that the various actions could be performed by a combination of specialized circuits and mechanical elements.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A towing arrangement on a vehicle comprising:
   at least two glad hands for receiving pressurized air; and
   a plurality of double check valves connecting the glad hands to valves associated with a braking system of the vehicle, wherein
      air from a first one of the glad hands is supplied through a first one of the double check valves to a spring brake modulating relay valve associated with spring brakes of the vehicle, and
      air from a second one of the glad hands is supplied
         through a second one of the double check valves to a first release valve associated with service brakes of a front axle of the vehicle; and
         through a third one of the double check valves to a second release valve associated with service brakes of a rear axle of the vehicle.

2. The towing arrangement of claim 1, comprising:
   a supply tank connected to the first glad hand for receiving air from the first glad hand;
   a primary tank for providing air to the second release valve and a secondary tank for providing air to the spring brake modulating relay valve wherein the primary and secondary tanks are connected to the supply tank and air to each of the primary and secondary tanks is provided by the supply tank.

3. The arrangement of claim 2, wherein the spring brake modulating relay valve monitors pressure in each of the primary and the secondary tanks.

4. The towing arrangement of claim 2, wherein the air supplied to the spring brake modulating relay valve releases spring brakes of the vehicle.

5. The towing arrangement of claim 2, wherein the air is supplied by the secondary tank to the spring brake modulating relay valve through a check valve.

6. The arrangement of claim 2, wherein the spring brake modulating relay valve provides an outlet for pressure release from spring brake chambers.

7. The towing arrangement of claim 1, wherein the first glad hand is an emergency glad hand attached to a front portion of the vehicle.

8. The towing arrangement of claim 7, wherein the emergency glad hand receives pressurized air from a towing truck.

9. The towing arrangement of claim 8, wherein the received air is pressurized by a compressor in the towing truck.

10. The towing arrangement of claim 1, wherein the second glad hand is a service glad hand attached to a front portion of the vehicle.

11. The towing arrangement of claim 10, wherein the service glad hand receives pressurized air from a towing truck.

12. A method for controlling a motion of a truck, comprising:
   establishing a connection from a towing truck to a plurality of glad hands of the truck;
   providing air via a first one of the glad hands and through a first double check valve to a spring brake modulating relay valve associated with spring brakes of the truck;
   releasing spring brakes of the truck with the air supplied through the first double check valve;
   detecting application of service brakes on the towing truck;
   providing air to a second double check valve and a third double check valve of the truck via a second one of the glad hands; and
   engaging service brakes of the truck with the air supplied to the second and third double check valves.

13. The method of claim 12, wherein the first glad hand is an emergency glad hand.

14. The method of claim 13, wherein the air is supplied to the emergency glad hand based on actuation of a button in a towing truck for signaling a delivery of pressurized air to the glad hand.

15. The method of claim 13, wherein the air supplied via the emergency glad hand is from a compressor of a towing truck.

16. The method of claim 12, wherein the second glad hand is a service glad hand.

17. The method of claim 12, wherein application of service brakes in the towing truck is via a treadle.

18. The method of claim 12, further comprising:
   detecting a release of the service brakes in the towing truck; and
   releasing air from service brakes of the vehicle.

19. The method of claim 12, further comprising:
   charging a primary and secondary tanks of the vehicle by air from a supply tank.

20. The method of claim 19, further comprising:
   supplying air from the primary tank to a treadle valve, a park control valve and a relay valve; and supplying air from the secondary tank to the treadle valve, the park control valve and an inversion valve.

* * * * *